United States Patent
Tsuruhara et al.

(10) Patent No.: US 7,174,241 B2
(45) Date of Patent: Feb. 6, 2007

(54) SPEEDOMETER CONTROLLER AND SPEEDOMETER CONTROL METHOD

(75) Inventors: Ryuzo Tsuruhara, Kariya (JP); Yasumi Inoue, Kariya (JP)

(73) Assignee: Advics Co., Ltd, Aichi-pref. (JP)

( * ) Notice: Subject to any disclaimer, the term of this patent is extended or adjusted under 35 U.S.C. 154(b) by 0 days.

(21) Appl. No.: 10/936,577

(22) Filed: Sep. 9, 2004

(65) Prior Publication Data

US 2005/0065664 A1 Mar. 24, 2005

(30) Foreign Application Priority Data

Sep. 24, 2003 (JP) ............................. 2003-331483

(51) Int. Cl.
G01P 7/00 (2006.01)
G01P 11/00 (2006.01)
(52) U.S. Cl. ........................... 701/1; 702/142; 340/441
(58) Field of Classification Search ................... 701/1, 701/93; 702/142, 145; 340/441, 442, 670, 340/444; 324/160, 161
See application file for complete search history.

(56) References Cited

U.S. PATENT DOCUMENTS

| | | | | |
|---|---|---|---|---|
| 4,876,650 A | * | 10/1989 | Kubo | ........................... 701/79 |
| 5,557,552 A | * | 9/1996 | Naito et al. | .................. 702/148 |
| 5,748,503 A | * | 5/1998 | Saeki et al. | .................. 702/148 |
| 5,876,101 A | * | 3/1999 | Taniguchi et al. | .......... 303/146 |
| 6,122,586 A | | 9/2000 | Shimizu | |
| 6,426,694 B1 | * | 7/2002 | Larson | ....................... 340/441 |
| 6,438,506 B1 | | 8/2002 | Yohpe et al. | |

FOREIGN PATENT DOCUMENTS

JP 8-268252 10/1996

OTHER PUBLICATIONS

Office Action issued from German Patent Office issued on Jan. 12, 2006 for the corresponding German patent application No. 10 2004 045 460.4-52 (English translation thereof).

* cited by examiner

Primary Examiner—Dalena Tran
(74) Attorney, Agent, or Firm—Posz Law Group, PLC

(57) ABSTRACT

A vehicle speed is obtained from detection signals obtained from wheel speed sensors. In a case where a vehicle speed calculation is shifted from a first method to a second method, a vehicle speed displayed on a speedometer is gradually changed from the vehicle speed obtained by the first method to the vehicle speed obtained by the second method. This avoids abrupt change in the displayed vehicle speed causing the driver to feel discomfort.

16 Claims, 2 Drawing Sheets

SPEEDOMETER CONTROLLER AND SPEEDOMETER CONTROL METHOD

CROSS REFERENCE TO RELATED APPLICATION

This application is based upon and claims the benefit of Japanese Patent Application No. 2003-331483 filed on Sep. 24, 2003, the content of which are incorporated herein by reference.

FIELD OF THE INVENTION

The present invention relates to a speedometer controller that obtains a vehicle speed based on detection signals from wheel speed sensors and a speedometer control method thereof.

BACKGROUND OF THE INVENTION

Related art is known in which a vehicle speed is obtained based on detection signals from wheel speed sensors and then displayed on a speedometer (refer to Japanese Laid-open Patent Publication No. HEI 8-268252). In the case where front and rear wheels have different diameters, the vehicle speed is calculated based on detection signals from either the front wheel or the rear wheel. For example, in a case of a rear wheel drive vehicle, the rear wheels are the object of vehicle speed calculation and the vehicle speed is obtained based on the detection signals from wheel speed sensors provided on rear wheels.

In a case where the front and rear wheels have different diameters and where the detection signals from the wheel speed sensor on the rear wheels that are used in the vehicle speed calculation are thought to be unreliable, for example, when a normal tire has been replaced with a spare, a correct vehicle speed cannot be obtained from the detection signals from the wheel speed sensor. Thus the correct vehicle speed cannot be obtained from the wheel speed sensor. In this case, the vehicle speed obtained from the vehicle speed sensor on the front wheels is corrected using a tire diameter ratio of the front and rear wheels, whereby the speedometer can display the actual vehicle speed after diameter correction.

Another related art obtains a vehicle speed from a mean value of a plurality of vehicle wheel speeds, based on detection signals from a plurality of wheel speed sensors. This mean value of the vehicle wheel speeds may be obtained, for example, based on detection signals from a plurality of wheel speed sensors provided on respective driving wheels. In a case where the vehicle speed is obtained in this manner, if it is probable that a detection signal from a sensor is not reliable due to noise of the detection signal from the wheel speed sensor, the vehicle speed is obtained solely from vehicle wheel speeds from other sensors.

In such art in which the vehicle speed based is obtained on the detection signals from the plurality of sensors, when reception of a detection signal from a wheel speed sensor is disabled by wire breakage, the vehicle speed is obtained solely from detection signals from other wheel speed sensors with no wire breakage.

In the case of diameter correction as described above, the vehicle speed is calculated by the rear wheels as the objects of calculation before the diameter correction. On the other hand after the diameter correction, the vehicle speed is calculated with the front wheels as the objects of calculation. Accordingly, the vehicle speed is calculated while taking into consideration the difference between the diameters of the front and rear wheels. This will cause a change in the vehicle speed before and after the diameter correction and, in a case where the speedometer display changes abruptly, the driver will be caused to feel discomfort.

In order to avoid the wheel speed sensor detection signal affected by the noise, or the wheel speed sensor detection signal from the wire-broken sensor, being used for vehicle speed calculation as described above, a previous vehicle speed may be used. However, in this case, an abrupt change in the speedometer display may cause the driver to feel discomfort if the newly obtained vehicle speed is different from the previous vehicle speed.

SUMMARY OF THE INVENTION

An object of the invention is to avoid an abrupt change in a displayed vehicle speed causing the driver to feel discomfort.

In a first aspect of the invention, a vehicle speed signal output unit includes a first calculation unit that calculates the vehicle speed by a first method depending on the detection result of the wheel speed detection unit, and a second calculation unit that calculates the vehicle speed by a second method, depending on the detection result of the wheel speed detection unit. A signal for the vehicle speed calculated by the first calculation unit is output prior to a predetermined timing while a signal for the vehicle speed calculated by the second calculation unit is output at and after the predetermined timing. Furthermore, the vehicle speed signal output unit outputs the signal for the vehicle speeds calculated by the second calculation unit after changing the signal for the vehicle speed calculated by the second calculation unit in such a manner that a displayed vehicle speed that is displayed on the speedometer is changed gradually from the vehicle speed calculated by the first calculation unit to the vehicle speed calculated by the second calculation unit, in a case where a difference between the vehicle speed calculated by the first calculation unit and the vehicle speed calculated by the second calculation unit at the predetermined timing is larger than a predetermined value.

In this way, the signals for the vehicle speed calculated by the second calculating unit is output after modification such that a displayed vehicle speed that is displayed on the speedometer changes gradually from the vehicle speed calculated by the first calculation unit to the vehicle speed calculated by the second calculation unit. Accordingly, it is possible to avoid the problem of the displayed vehicle speed changing abruptly, which may cause the driver to feel discomfort. Accordingly, the driver is not caused discomfort by the abrupt change in the displayed vehicle speed.

For instance, the vehicle speed signal output unit may perform modification such that the signal for the vehicle speed calculated by the second calculation unit is output after modifying the signal for the vehicle speed calculated by the second calculation unit in a manner that the speedometer is changed step by step from the vehicle speed calculated by the first calculation unit to the vehicle speed calculated by the second calculation unit.

In a second aspect of the invention, a signal for the vehicle speed calculated by the first calculation unit is output prior to a predetermined timing and, at and after the predetermined timing, a signal for the vehicle speed calculated by the second calculation unit is output in a case where a difference between the vehicle speed obtained by the first method and the vehicle speed obtained by the second method is equal to or smaller than a predetermined value. In a case where the difference is larger than the predetermined value, the signal for the vehicle speed calculated by the first calculation unit is continuously output until the vehicle speed is reduced to zero and then the vehicle speed calculated by the second calculation unit is output.

In this way, it is possible to display the vehicle speed obtained by the first method on the speedometer until the vehicle speed is reduced to zero, or until the vehicle stops and, after this, to display the vehicle speed obtained by the second method on the speedometer. Thus, the same effect as described above can be achieved.

According to a third aspect of the invention, the first calculation unit calculates the vehicle speed based on the detection result of the wheel speed sensor provided on one of a front wheel and a rear wheel of the vehicle, and the second calculation unit calculates the vehicle speed based on the detection result of the wheel speed sensor provided on the other one of the front wheel and the rear wheel of the vehicle. In this way, the invention applies to a case where the vehicle speed is obtained by different methods, the first and the second.

In this case, the second calculation unit, for instance, may be configured such that the vehicle wheel speed obtained based on the detection signal from the wheel speed sensors provided on the other one of the front and rear wheels of the vehicle is corrected based on a diameter difference between the front wheel and the rear wheel, and the vehicle speed is obtained based on the correction result.

Moreover, the first calculation unit may be configured such that the wheel speed detection unit assumes a mean value of the vehicle wheel speeds of both driving wheels obtained based on the detection signals from the wheel speed sensors provided on the driving wheels of the vehicle to be the vehicle speed while the second calculation unit assumes one of the vehicle wheel speeds of the driving wheels obtained based on the detection signals from the wheel speed sensors provided on the driving wheels of the vehicle to be the vehicle speed.

In this case, the timing at which the vehicle speed signal output unit switches from the vehicle speed calculation of the first calculation unit to the vehicle speed calculation with the second calculation unit is based on (i) when noise affects the detection signals from one of the wheel speed sensors on the driving wheels or (ii) when reception of a detection signal from a wheel speed sensor is disabled by a wire breakage.

According to a fourth aspect of the invention, object wheels that are the object of the vehicle wheel speed calculation with the first and second calculation units are different from each other. With this configuration, the invention may be applied cases where the object wheel for vehicle speed calculation is changed.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
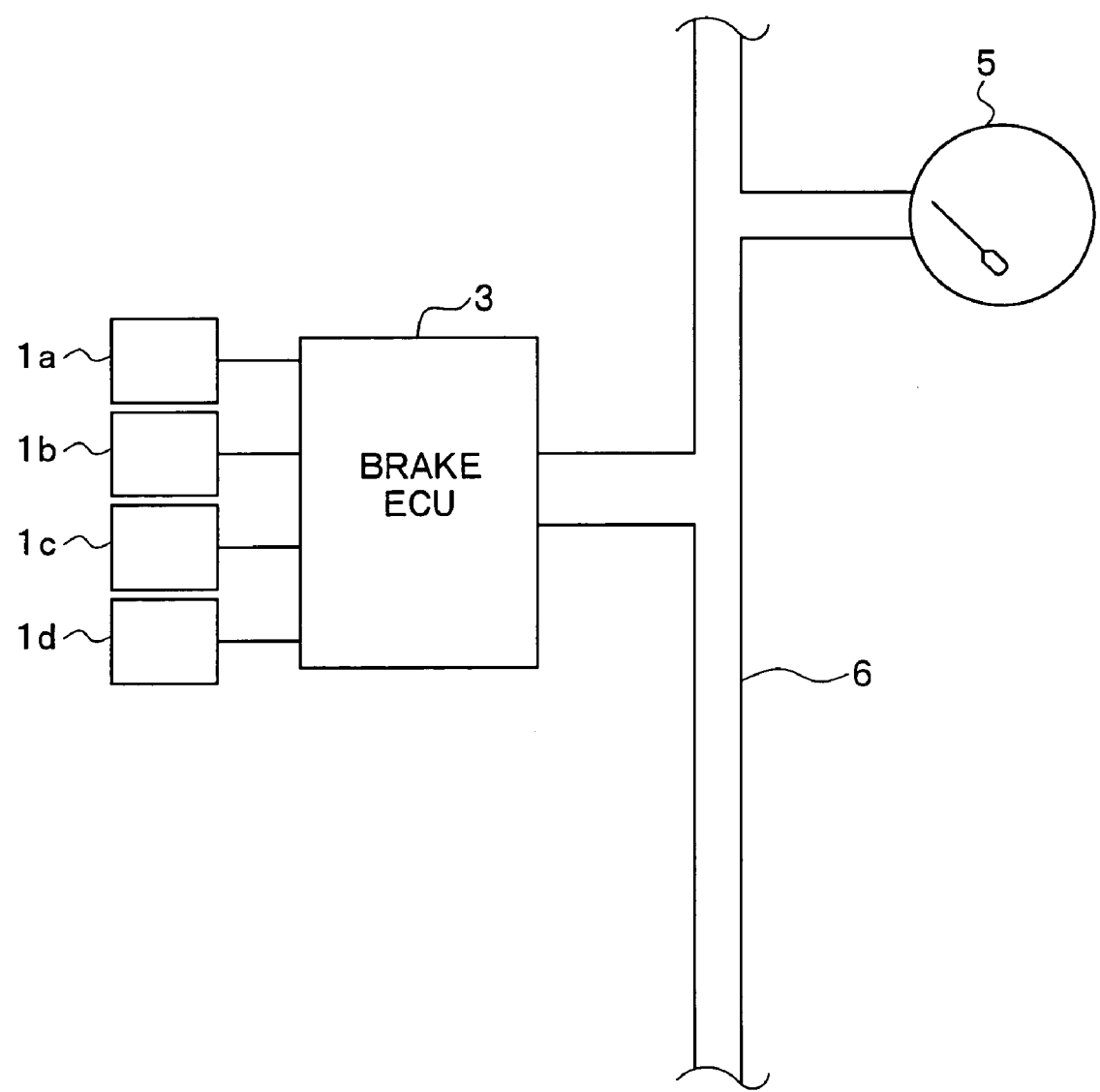
FIG. 1 is a block diagram showing the configuration of a speedometer control system according to the first embodiment of the invention.

The present invention will be described further with reference to various embodiments in the drawings.

First Embodiment

FIG. 1 shows a block diagram of a speedometer control system as an application of the first embodiment. The speedometer control system of the first embodiment is described with reference to the drawings.

The speedometer control system has a structure including wheel speed sensors $1a$–$1d$ provided on a vehicle, a brake ECU 3 for an ABS control and a traction control for driving an ABS actuator, a speedometer 5 and a serial communication line 6 for connecting these structural components.

The wheel speed sensors $1a$ to $1d$ are provided respectively on the wheels, not shown, of a vehicle and the wheel speed sensors $1a$ to $1d$ are provided respectively on the wheels of the vehicle, and output pulse signals that become vehicle wheel speed signals of the corresponding wheels. The vehicle wheel speed signals are used in, for example, a vehicle wheel speed calculation of the respective wheels, a vehicle body speed calculation and a slip ratio calculation.

The brake ECU 3 corresponds to a braking force control unit for a brake control that is based on an operation amount of a brake pedal, not shown in FIG. 1. A brake control signal that is output from the brake ECU 3 to the ABS actuator, for instance, application of control voltage to a solenoid for a solenoid valve and a motor provided in the ABS actuator, controls brake fluid pressure that is generated on each wheel cylinder, and thus controls a braking force generated on respective wheels.

The brake ECU 3 receives vehicle wheel speed signals from the wheel speed sensors $1a$ to $1d$, calculates vehicle wheel speeds and a vehicle speed (vehicle body speed) based on the vehicle wheel speed signals, and outputs signals for the vehicle speed to the serial communication line 6. Based on a slip ratio obtained from the vehicle wheel speeds and vehicle speed, an acceleration slip or a locking tendency is detected. Then in order to perform the traction control for inhibiting the acceleration slip or the ABS control for inhibiting the locking tendency, a brake control signal is output to the ABS actuator. To perform the traction control, the pressures of wheel cylinders of driving wheels are increased to reduce the driving force transmitted to the driving wheels for control of acceleration slip. Alternatively, when the ABS control is performed, the pressures of the wheel cylinders of driving wheels that are likely to lock are reduced and maintained and pulsed at that level in order to inhibit the locking tendency.

More specifically, the brake ECU 3 primarily obtains the vehicle speed by the first method and, in a case where obtainment by a first method is inappropriate, the vehicle speed is obtained by a second method.

As the first method, for instance, the vehicle speed may be obtained from a mean value of the vehicle wheel speeds of the respective driving wheels. However, if the spare tire is replaced, the vehicle speed cannot be obtained desirably from the vehicle wheel speeds. Thus, as the second method, for instance, the vehicle speed may be obtained through correcting a mean value of the respective vehicle wheel speeds of driven wheels with a tire diameter ratio of the driving wheels and driven wheels (diameter correction).

In another example of the first method, one of the vehicle wheel speeds of one of the driving wheels may be used. If the detection signals from the wheel speed sensors $1a$ to $1d$ provided on the driving wheels are affected by noise, or if reception of a detection signal from a wheel speed sensor is disabled by wire breakage, as the second method, for instance, a wheel speed of the other driving wheels is taken as the vehicle speed.

In the brake ECU 3, a portion that performs wheel speed calculations corresponds to a wheel speed detection unit and a portion that outputs signals related to a vehicle speed corresponds to the vehicle speed signal output unit. In the vehicle speed signal output unit, a portion that obtains the vehicle speed by the first method corresponds to a first calculation unit and a portion that obtains the vehicle speed by the second method corresponds to a second calculation unit.

The speedometer 5 that displays the vehicle speed is included in a display unit that is provided inside an instrument panel. After the brake ECU 3 calculates the vehicle speed with reference to the detection signals from the wheel speed sensor 3, the signal for the vehicle speed is transmitted from the brake ECU 3 to the speedometer 5.

The serial communication line 6 connects between the brake ECU 3 and the speedometer 5. The speedometer 5 receives the signals for the vehicle speed from the brake ECU 3 via the serial communication line 6.

Next, the processing performed by the speedometer control system with the configuration described above is explained with reference to a flowchart illustrating a speedometer control routine shown in FIG. 2.

Figure 2:
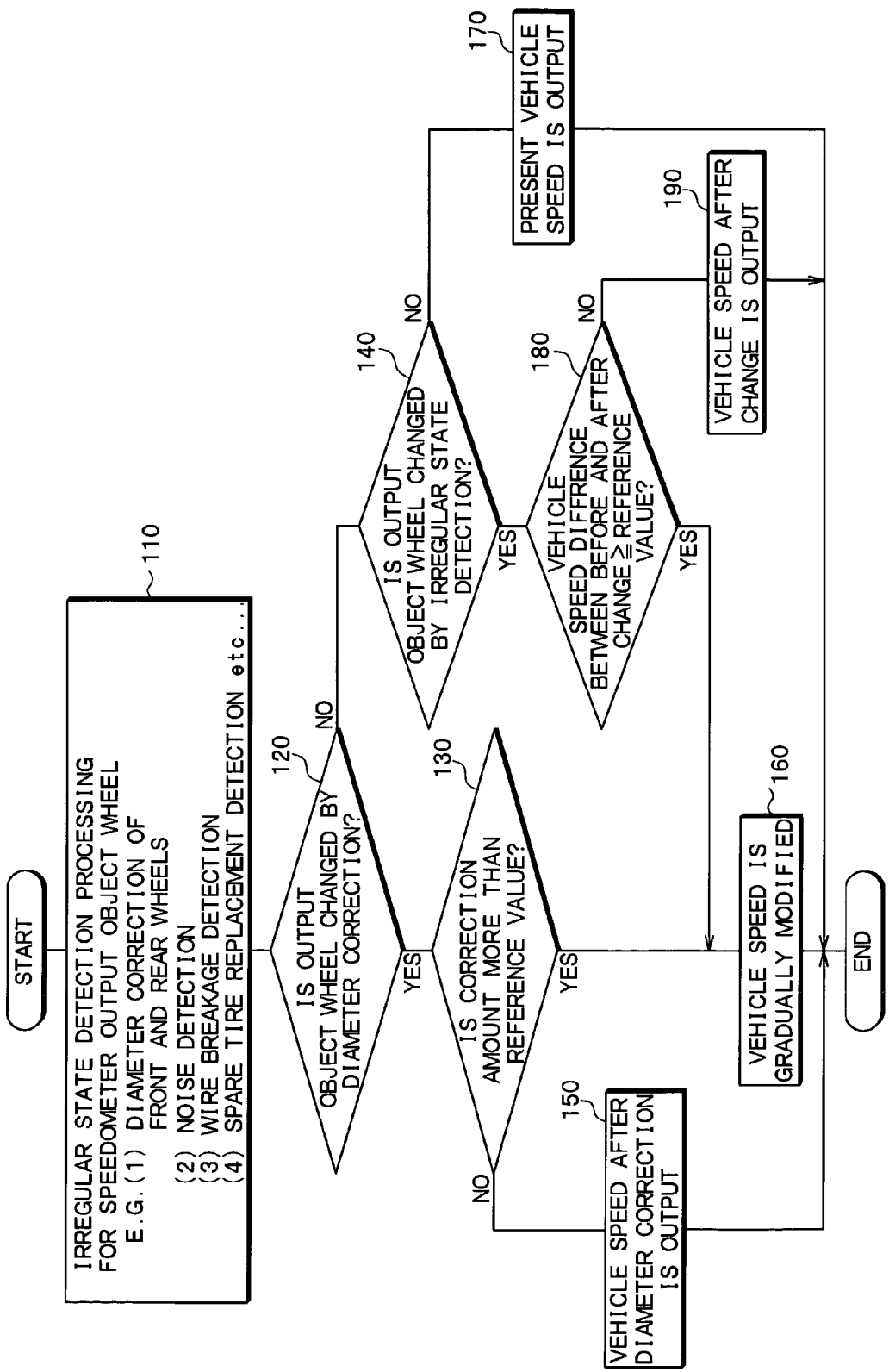
FIG. 2 is a flowchart of a speedometer control routine.

The speedometer control routine shown in FIG. 2 is performed by the brake ECU 3 at the same time as when an ignition switch (not shown) that is provided inside a passenger compartment is turned on. This processing is performed whenever the brake ECU 3 calculates the vehicle speed, for instance, with a control cycle time of 6 ms.

First, at 110, a detection processing is performed to detect whether or not a vehicle wheel that is an object vehicle wheel of the speedometer output is in an irregular state. This processing detects if the vehicle speed calculation has switched from the first method to the second method. More specifically, objects of detection include occurrence of any diameter correction between the front and rear wheels, in other words, between the driving wheels and the driven wheels; any noise detection; any wire breakage in the wheel speed sensors 1*a* to 1*d;* and any spare tire replacement.

For instance, with regard to the diameter correction of the front and rear wheels, the corrected vehicle speeds are stored based on, for example, setting of a flag inside the brake ECU 3. The corrected vehicle wheel speed setting read in the detection processing. Regarding noise detection, if any noise of predetermined frequencies is found to affect any of the detection signals from the wheel speed sensors 1*a* to 1*d* to be used in the vehicle speed calculation, the vehicle wheel speeds are stored in the same way as above in the brake ECU 3, and these stored results are read in the detection processing. Regarding detection of wire breakage of the wheel speed sensors 1*a* to 1*d,* the fact that no detection signals have been received from the wheel speed sensors 1*a* to 1*d* is stored. Then, the vehicle wheel speeds are stored in the same way as above in the brake ECU 3 and these stored results are read in the detection processing. Regarding spare tire replacement, the detection signals from the wheel speed sensors 1*a* to 1*d* for both vehicle wheels attached to the same axle are compared and the determination is based on whether or not a significant difference exists between the pulse values of the signals.

Next, the routine proceeds to the processing at 120 where it is determined whether or not the object wheel for the vehicle speed calculation after diameter correction between the front and rear wheels has been updated. This determination processing is performed based on the detection result at 110. If an affirmative determination is made, the routine proceeds to the processing at 130 and, if a negative determination is made, the routine proceeds to the processing at 140.

At 130, it is determined whether or not a diameter correction amount of the front and rear wheels is more than a reference value. In other words, whether or not a correction coefficient obtained from a diameter ratio of the driving wheels and the driven wheels is less than a reference value determines whether or not a difference between the vehicle speed obtained by the first method and the one obtained by the second method is significant.

Therefore, if the diameter correction amount is less than the reference value, there is no significant difference between the vehicle speeds. Thus it can be assumed that even if the vehicle wheel speed is output as is to vehicle speed display, the driver will not be caused to feel discomfort. Accordingly, the routine proceeds to the processing at 150 and a signal corresponding to a vehicle speed obtained from the wheel speeds after completion of the diameter correction is output to the speedometer 5. Accordingly, the speedometer 5 displays the vehicle speed.

However, if the diameter correction amount is more than the reference value, there is a significant difference between the vehicle speeds and thus it can be assumed that if the vehicle wheel speed is output as is to the vehicle speed display, the driver will be caused to feel discomfort. Accordingly, the routine proceeds to the processing at 160 and a signal for the vehicle speed is modified so that the vehicle wheel speed displayed on the speedometer 5 changes such that the difference between the vehicle speed obtained by the first method and the one obtained by the second method is reduced by a predetermined amount each second. Thus, the vehicle wheel speed displayed on the speedometer 5 gradually shifts from the speed obtained by the first method to the one obtained by the second method.

Note that the processing at 140 determines whether or not any irregularity other than the diameter correction of the front and rear wheels has caused the object wheel of the vehicle speed calculation to be changed. This determination processing is also performed based on the detection result from the processing at 110. If a negative determination is made, it is assumed that the object wheel to be used has not been changed, and the routine proceeds to the processing at 170 where a signal corresponding to the presently obtained vehicle speed is output to the speedometer 5.

If an affirmative determination is made at 140, the routine proceeds to the processing at 180 and it is determined whether or not the difference in the vehicle speed before and after the change of the object wheel for the vehicle speed calculation, in other words, the difference in the vehicle speed obtained by the first method and the second method is not less than the reference value is determine. If an affirmative determination is made here, it is assumed that if the vehicle wheel speed is displayed as is on the vehicle speed display, the driver will be caused to feel discomfort. Accordingly, the routine proceeds to the processing at 160, and a signal corresponding to the vehicle speed is modified as described above and output to the speedometer 5. If a negative determination is made here, it is assumed that if the vehicle wheel speed is displayed as is on the vehicle speed display, the driver will not be caused to feel discomfort. Accordingly, the routine proceeds to the processing at 190, and a signal corresponding to the vehicle speed after the change in the object wheels for vehicle speed calculation is output to the speedometer 5.

As described above, in the case where there is the significant difference in the obtained vehicle speed when the method for obtaining the vehicle speed is switched from the first method to the second method, the vehicle wheel speed is shifted step by step from the vehicle speed obtained by the first method to the vehicle speed obtained by the second method. Thus, is the vehicle wheel speed can be displayed on the speedometer 5 without causing the driver to feel discomfort Other Embodiments In the embodiment described above, the vehicle speed obtained by the first method is gradually shifted to the vehicle speed obtained by the second method in a step-by-step manner when there is significant difference in the vehicle speed obtained by the methods when shifting from the first to the second method. However, the modification in the vehicle speed may be performed in a stepless manner in stead of in the step-by-step manner. In this case, it is desirable to make the vehicle speed shift at a gentle acceleration speed. For instance, the vehicle speed shift may be shifted at an acceleration speed equivalent to 0.3 G. Note that a deceleration speed generated when a driver depresses a brake pedal when a traffic light changes to red is equivalent to 0.3 G.

Furthermore, in the embodiment described above, the examples of shifting from the first method to the second method include the cases of diameter correction calculation, noise detection, wire breakage detection and spare tire replacement. Note that these are only some examples, and the invention is applicable to other cases, including a change in the calculation method for obtaining the vehicle speed based on the wheel speeds or a change in the object wheel of the calculation.

For instance, a variety of vehicle speed calculation methods are known in which, for example, a maximum value is employed for each wheel speed or wheel speeds of the driving wheels or mean values thereof, are applied. This invention may be applied to any change in these calculation methods, or to a change in the wheel that is the object of calculation while the calculation method remains the same.

While the above description is of the preferred embodiments of the present invention, it should be appreciated that the invention may be modified, altered, or varied without deviating from the scope and fair meaning of the following claims.

What is claimed is:

1. A speedometer controller including: a vehicle wheel speed detection unit for detecting respective vehicle wheel speeds based on respective detection signals from wheel speed sensors equipped on a vehicle; a vehicle speed signal output unit for obtaining a vehicle speed, based on a detection result of the vehicle wheel speed detection unit, and outputting a signal for the vehicle speed, and a speedometer for displaying the vehicle speed, based on the signal for the vehicle speed; characterized in that the vehicle speed signal output unit comprises:

a first calculation unit for calculating the vehicle speed by a first method depending on the detection result of the wheel speed detection unit, and a second calculation unit for calculating the vehicle speed by a second method, depending on the detection result of the wheel speed detection unit, and wherein a signal for the vehicle speed calculated by the first calculation unit is output prior to a predetermined timing while a signal for the vehicle speed calculated by the second calculation unit is output at and after the predetermined timing; and the vehicle speed signal output unit outputs the signals for the vehicle speed calculated by the second calculation unit after modifying the signals for the vehicle speed calculated by the second calculation unit in such a manner that a displayed vehicle speed that is displayed on the speedometer is changed gradually from the vehicle speed calculated by the first calculation unit to the vehicle speed calculated by the second calculation unit, in a case where a difference between the vehicle speed calculated by the first calculation unit and the vehicle speed calculated by the second calculation unit at the predetermined timing is larger than a predetermined value.

2. The speedometer controller according to claim 1, characterized in that the vehicle speed signal output unit outputs the signal for the vehicle speed calculated by the second calculation unit after modifying the signal for the vehicle speed calculated by the second calculation unit in such a manner that the displayed vehicle speed of the speedometer is changed step by step from the vehicle speed calculated by the first calculation unit to the vehicle speed calculated by the second calculation unit.

3. The speedometer controller according to claim 1, characterized in that the vehicle speed signal output unit outputs the signal for the vehicle speed calculated by the second calculation unit after modifying the signal for the vehicle speed calculated by the second calculation unit in such a manner that the speedometer is changed steplessly from the vehicle speed calculated by the first calculation unit to the vehicle speed calculated by the second calculation unit.

4. The speedometer controller according to claim 1, characterized in that the first calculation unit obtains the vehicle speed, based on the detection result of the wheel speed sensor provided on one of a front wheel and a rear wheel of the vehicle, and the second calculation unit obtains the vehicle speed based on the detection results of the wheel speed sensor provided on the other one of the front wheel and the rear wheel of the vehicle.

5. The speedometer controller according to claim 4, characterized in that the second calculation unit obtains the vehicle speed after correcting a vehicle wheel speed obtained by the wheel speed detection unit based on the detection signal of the wheel speed sensor provided on the other one of the front wheel and the rear wheel of the vehicle, the correction being based on a difference in respective diameters of the front wheel and the rear wheel.

6. The speedometer controller according to claim 1, characterized in that the first calculation unit assumes a mean value of the vehicle wheel speeds of both driving wheels obtained from the detection signals of the wheel speed sensors provided on the driving wheels of the vehicle to be the vehicle speed,and the second calculation unit assumes either one of the vehicle wheel speeds of the driving wheels obtained from the detection signals of the wheel speed sensors provided on the driving wheels of the vehicle to be the vehicle speed.

7. The speedometer controller according to claim 6 characterized in that the vehicle speed signal output unit sets the predetermined timing for switching from the vehicle speed calculation with the first calculation unit to the vehicle speed calculation with the second calculation unit based on when noise affects the detection signal from the wheel speed sensor of either one of the driving wheels, or when reception of at least one of the detection signals from at least one of the wheel speed sensors is disabled by wire breakage.

8. The speedometer controller according to claim 1, characterized in that wheels that are the objects for calculation of the vehicle speeds by the first and second calculation units are different from each other.

9. A speedometer controller including: a vehicle wheel speed detection unit that detects respective vehicle wheel speeds based on respective detection signals from wheel speed sensors equipped on a vehicle; a vehicle speed signal output unit which obtains a vehicle speed based on a detection result of the vehicle wheel speed detection unit, and which outputs a signal for the vehicle speed, and a speedometer that displays the vehicle speed, based on the signal for the vehicle speed; characterized in that the vehicle speed signal output unit comprises:

a first calculation unit that obtains the vehicle speed by a first method, depending on the detection result of the wheel speed detection unit, and a second calculation unit that obtains the vehicle speed by a second method depending on the detection result of the wheel speed detection unit, and wherein a signal for the vehicle speed calculated by the first calculation unit is output prior to a predetermined timing and, at and after the predetermined timing, a signal for the vehicle speed calculated by the second calculation unit is output in a case where a difference between the vehicle speed obtained by the first calculation unit and the vehicle speed obtained by the second calculation unit is equal to or smaller than a predetermined value while, in a case where the difference is larger than the predetermined value, the signal for the vehicle speed calculated by the first calculation unit is continuously output until the vehicle speed is reduced to zero and then the vehicle speed calculated by the second calculation unit is output.

10. The speedometer controller according to claim 9, characterized in that the first calculation unit obtains the vehicle speed, based on the detection result of the wheel speed sensor provided on one of a front wheel and a rear wheel of the vehicle, and the second calculation unit obtains the vehicle speed based on the detection results of the wheel speed sensor provided on the other one of the front wheel and the rear wheel of the vehicle.

11. The speedometer controller according to claim 10, characterized in that the second calculation unit obtains the vehicle speed after correcting a vehicle wheel speed obtained by the wheel speed detection unit based on the detection signal of the wheel speed sensor provided on the other one of the front wheel and the rear wheel of the vehicle, the correction being based on a difference in respective diameters of the front wheel and the rear wheel.

12. The speedometer controller according to claim 9, characterized in that the first calculation unit assumes a mean value of the vehicle wheel speeds of both driving wheels obtained from the detection signals of the wheel speed sensors provided on the driving wheels of the vehicle to be the vehicle speed, and the second calculation unit assumes either one of the vehicle wheel speeds of the driving wheels obtained from the detection signals of the wheel speed sensors provided on the driving wheels of the vehicle to be the vehicle speed.

13. The speedometer controller according to claim 12 characterized in that the vehicle speed signal output unit sets the predetermined timing for switching from the vehicle speed calculation with the first calculation unit to the vehicle speed calculation with the second calculation unit based on when noise affects the detection signal from the wheel speed sensor of either one of the driving wheels, or when reception of at least one of the detection signals from at least one of the wheel speed sensors is disabled by wire breakage.

14. The speedometer controller according to claim 9, characterized in that wheels that are the objects for calculation of the vehicle speeds by the first and second calculation units are different from each other.

15. A speedometer control method for detecting vehicle wheel speeds of respective wheels based on detection signals from wheel speed sensors provided on a vehicle; obtaining a vehicle speed based on the detection result; outputting a signal for the vehicle speed; and displaying the vehicle speed on a speedometer, characterized in that the vehicle speed is obtained by both a first method and a second method and, depending on the vehicle wheel speeds, a signal for the vehicle speed obtained by the first method is output prior to a predetermined timing while a signal for the vehicle speed obtained by the second method is output at and after the predetermined timing, and a signal for the vehicle speed calculated by the second calculation unit is output after being modified such that a displayed vehicle speed that is displayed on the speedometer is changed gradually from the vehicle speed obtained by the first method to the vehicle speed obtained by the second method in a case where, at the predetermined timing, a difference between the vehicle speed obtained by the first method and is equal to or larger than a reference value.

16. A speedometer control method for detecting vehicle wheel speeds of respective wheels based on detection signals from wheel speed sensors provided on a vehicle; obtaining a vehicle speed based on the detection result; outputting a signal for the vehicle speed; and displaying the vehicle speed on a speedometer, characterized in that the vehicle speeds are obtained by both a first method and a second method wherein, depending on the vehicle wheel speeds, a signal for the vehicle speed obtained by the first method is output prior to a predetermined timing and, at and after the predetermined timing, a signal for the vehicle speed obtained by the second method is output in a case where a difference between the vehicle speed obtained by the first method and the vehicle speed obtained by the second method is smaller than a predetermined value while, in a case where the predetermined value is exceeded, the signal for the vehicle speed obtained by the first method continues to be output until the vehicle speed of the vehicle is reduced to zero and then the signal for the vehicle speed obtained by the second method is output.

* * * * *